United States Patent
Oglesbee et al.

(10) Patent No.: US 6,771,051 B2
(45) Date of Patent: Aug. 3, 2004

(54) THERMALLY LIMITED BATTERY PROTECTION AND CHARGING CIRCUIT

(75) Inventors: John W. Oglesbee, Watkinsville, GA (US); John E. Herrmann, Sugar Hill, GA (US); Michael D. Geren, Suwanee, GA (US); David M. Demuro, Snellville, GA (US); Roger L. Boyer, Snellville, GA (US)

(73) Assignee: Motorola, Inc., Schaumburg, IL (US)

( * ) Notice: Subject to any disclaimer, the term of this patent is extended or adjusted under 35 U.S.C. 154(b) by 102 days.

(21) Appl. No.: 10/185,095

(22) Filed: Jun. 29, 2002

(65) Prior Publication Data

US 2004/0095097 A1 May 20, 2004

(51) Int. Cl.[7] .................................................. H02J 7/16
(52) U.S. Cl. ...................................................... 320/150
(58) Field of Search ................................ 320/150, 153; 323/266, 273, 274, 279, 282, 284, 285; 361/18, 90, 93.8, 103; 327/524; 340/3.1, 3.9

(56) References Cited

U.S. PATENT DOCUMENTS

| | | | | |
|---|---|---|---|---|
| 4,255,698 A | * | 3/1981 | Simon ........................ 320/150 |
| 4,973,936 A | * | 11/1990 | Dimpault-Darcy et al. ........................ 338/32 R |
| 5,703,463 A | * | 12/1997 | Smith et al. ................ 320/152 |
| 5,815,382 A | * | 9/1998 | Saint-Pierre et al. .......... 363/97 |
| 6,300,750 B1 | | 10/2001 | Oglesbee et al. |

OTHER PUBLICATIONS

U.S. patent application Ser. No. 10/077,355, Oglesbee, filed Feb. 15, 2002.

* cited by examiner

*Primary Examiner*—Pia Tibbits
(74) *Attorney, Agent, or Firm*—Philip H. Burrus, IV

(57) ABSTRACT

This invention includes a thermally stable, low-cost charging circuit for rechargeable batteries. The circuit includes a thermal control circuit that employs a temperature dependent component such as a thermistor or positive temperature coefficient device. The temperature dependent device is thermally coupled to a charging pass element, which is typically a power transistor. When the transistor enters a danger zone, which is a region of operation characterized by elevated power dissipation in the pass element, the thermal control circuit is actuated to regulate the pass element in a constant power mode until the circuit exits the danger zone.

13 Claims, 6 Drawing Sheets

-PRIOR ART-

THERMALLY LIMITED BATTERY PROTECTION AND CHARGING CIRCUIT

BACKGROUND

1. Technical Field

This invention relates generally to battery charging and protection circuits, and more specifically to a thermally-limited charging circuit with overcharge and undercharge protection.

2. Background Art

Electronic devices, including cellular phones, pagers, radios, compact disc players, MP3 players, portable computers, and the like are becoming ever more popular. These devices are gaining popularity due to their portability. The devices derive their portability from the use of rechargeable batteries as a power source. Rechargeable batteries, of course, require a battery charger to inject current or "charge", thereby causing the battery to store energy for future use in the electronic device.

FIG. 1 illustrates a simple battery charger 100 that is well known in the art. The charger 100 consists of a power supply 101, a linear regulator 102, a pass element 103 and a battery cell 104. The power supply 101 provides voltage and current to the battery cell 104. The voltage and current must be regulated by the pass element 103 so as to avoid charging the battery cell 104 too, rapidly. The linear regulator 102 performs this regulation by dissipating as heat the difference between the power generated by the power supply 101 and the power stored by the battery cell 104.

The problem with this prior art solution is that the pass element 103 can overheat. This is best explained by way of example. For a typical single-cell, lithium battery application, a fully charged battery cell 104 typically registers about 4.1 volts. Thus, to fully charge the battery cell 104, and to give enough headroom for parasitic power losses in the pass element 103 and connecting circuitry, the power supply must be capable of supplying at least 5 volts. A typical battery cell 104 will charge optimally at a current of roughly 1 amp.

The problem arises with the battery cell 104 is fully discharged. A discharged battery cell 104 may register only 2 volts. As the power supply 101 would supply energy at a rate of 5 volts at 1 amp, or 5 watts, and the battery cell 104 stores energy at a rate of 2 volts at 1 amp, or 2 watts, the pass element 103 must dissipate energy at a rate of 3 watts. As typical pass elements 103 may come in an industry-common TO-220 package, 3 watts for extended periods of time may make the pass element 103 quite warm. Extended periods of heat my actually jeopardize reliability by approaching—or surpassing—the threshold junction temperature of the pass element 103.

The problem is exacerbated when an incompatible power supply 101 is coupled to the circuit. For example, if someone accidentally couples a 12-volt supply to the charger, the pass element 103 may have to dissipate 10 watts! This can eventually lead to thermal destruction of the pass element 103.

One solution to this problem is recited in U.S. Pat. No. 5,815,382, issued to Saint-Pierre et al. entitled "Tracking Circuit for Power Supply Output Control". This solution provides a means of reducing the output voltage of a power supply when the battery is in a discharged state, thereby reducing the total output power of the power supply. This, in turn, reduces the amount of power a pass element would need to dissipate.

While this is a very effective solution to the problem, it requires a power supply that both includes a feedback input and is responsive to the input by changing the output voltage. The electronics associated with an adjustable power supply can be more expensive that those found is a simple linear transformer power supply.

There is thus a need for an improved means of regulating temperature in a power-dissipating element like those employed as pass elements in battery charging applications.

DETAILED DESCRIPTION OF THE INVENTION

Figure 1:
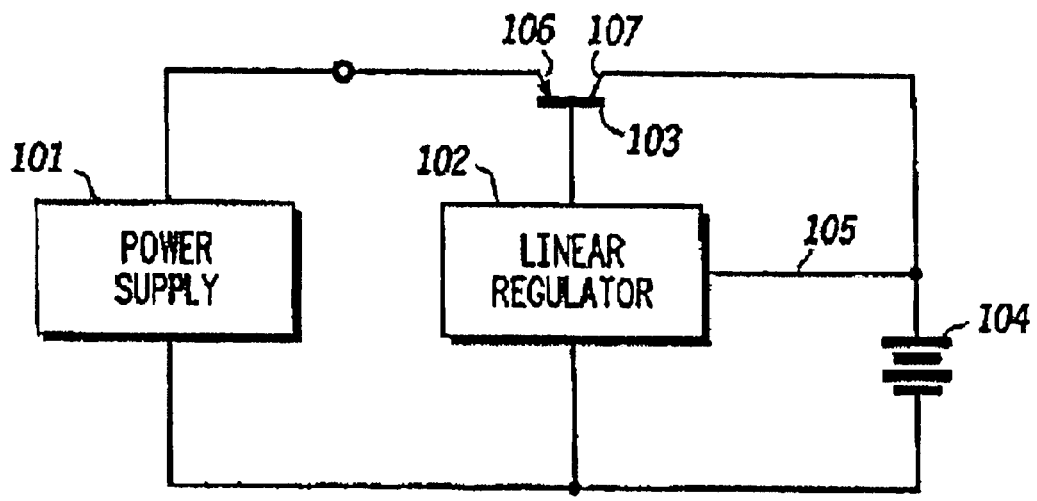
FIG. 1 is an illustration of a prior art charging circuit.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Prior to turning to the specifics of the invention, it is well to briefly examine the operating regions in which there is a risk of thermal damage to a pass element. This is best explained by looking at battery charging applications, although it will be obvious to those of ordinary skill in the art that the invention may be equally applied to other applications as well.

Figure 2:
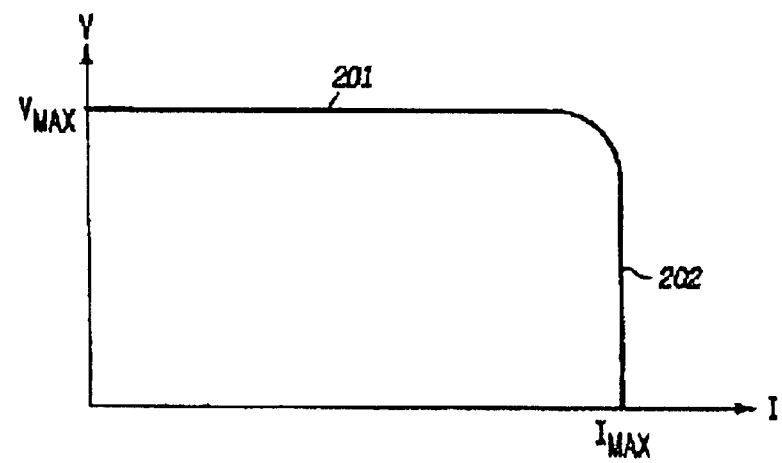
FIG. 2 is an illustration of the characteristic output of a constant current, constant voltage power supply.

Referring now to FIG. 2, illustrated therein is the output characteristic 200 of a "constant-voltage-constant-current", or "CCCV", power supply. Such supplies are known in the art, as recited by U.S. Pat. No. 5,023,541, entitled "Power Supply Control Circuit Having Constant Voltage and Constant Current Modes". Another such supply is taught in the application notes for the TL494 control IC manufactured by On-Semiconductor. Segment 201 illustrates a constant voltage of Vmax that is supplied for all load currents less than Imax. Once the load current attempts to exceed Imax, segment 202 represents the maximum current, Imax, that is delivered as the voltage tapers from Vmax to zero.

Figure 3:
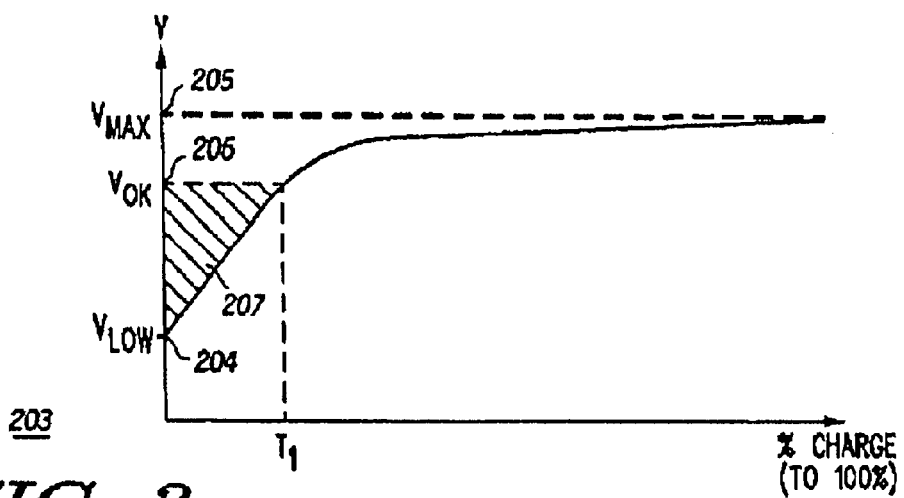
FIG. 3 illustrates a danger zone of operation in accordance with the invention.

Referring now to FIG. 3, illustrated therein is a charging characteristic 203 of the circuit of FIG. 1 when a CCCV source is employed as the power supply. The characteristic 203 is represented as voltage versus percentage of charge. Presuming that an initially discharged battery cell is coupled to the supply, the charging curve begins at Vlow 204, which essentially represents the voltage of the discharged battery cell. The power supply, by contrast, begins at Vmax 205.

Consequently, there is a difference Vmax 205 minus Vlow 204 that proportionally corresponds to the power that must be dissipated by the pass element. Experimental and theoretical results have shown that a threshold exists, Vok 206, above which standard pass elements are capable of dissipating power for a given charge rate. However, when the battery cell voltage is below Vok 206, the pass element is called upon to dissipate more power than it can withstand. Thus, the shaded region 207 represents the "danger zone" for the pass element. Note that the current is below Imax for the voltage to be Vmax.

Figure 4:
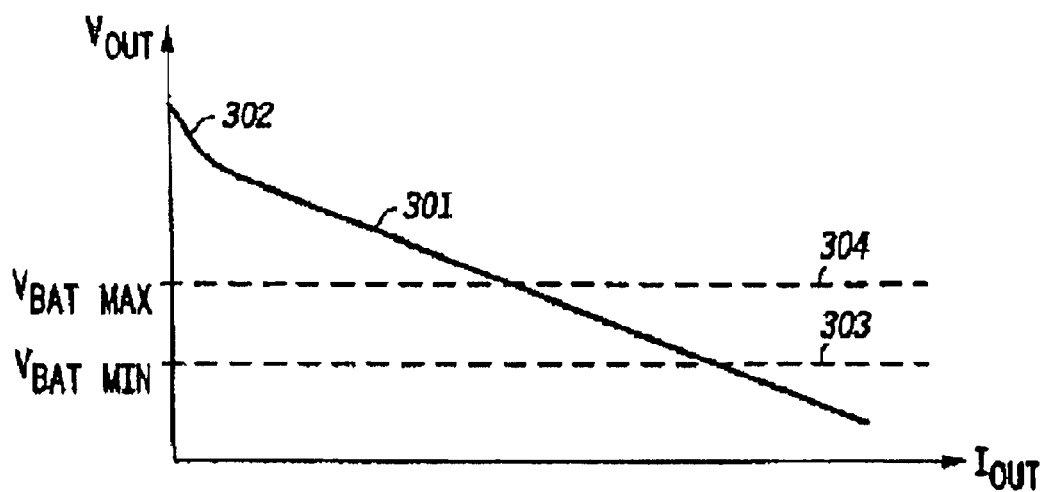
FIG. 4 is an illustration of the characteristic output of a wall transformer power supply.

Referring now to FIG. 4, illustrated therein is the output characteristic 300 for another common power supply, the linear transformer. It may be seen from segment 301 that voltage generally rolls off as current increases. A small peak at segment 302 may be caused by rectification circuitry that includes filter capacitors. In any event, the battery charges between the levels Vbatmin 303 and Vbatmax 304.

Figure 5:
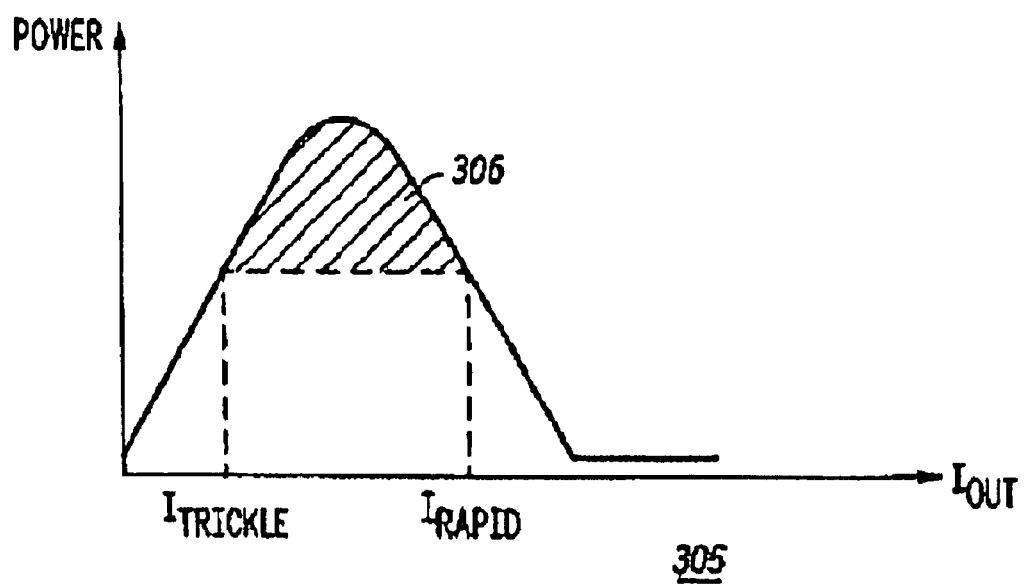
FIG. 5 illustrates a danger zone of operation in accordance with the invention.

Referring now to FIG. 5, illustrated therein is the power generated by the circuit of FIG. 1 when a linear transformer is employed as the power supply. When the battery cell voltage approaches its termination point, Vbatmax 304 of FIG. 4, the voltage of the transformer continues to increase while the battery voltage stays relatively constant. This means that the pass element must be able to dissipate the extra power that results from this increasing voltage differential. As a result of the extra power, a pass element danger zone for linear transformers exists in the shaded region 306.

To summarize the preceding discussion, there are regions of operation in which a battery charger having a pass element works well with no temperature compensation. There are other danger zones, however, where pass element reliability may be compromised due to the high power dissipation. It is one object of this invention to provide a circuit that prevents pass elements or other power dissipating elements from entering danger zones. The invention regulates the power dissipation of the pass element by limiting the power dissipation to a predetermined level.

Referring again to FIG. 1, the power dissipated in the pass element 103 may be expressed as the voltage of the power supply 101, minus the voltage of the battery cell 104, multiplied by the charge current. If the pass element 103 comprises a PNP bipolar junction transistor, as is common in the art, the voltage of the power supply 101, minus the voltage of the battery cell 104 may simply be represented as Vce, the voltage difference between the emitter 106 voltage and the collector 107 voltage. Thus, the power is given as:

$$P = Vce * Ichg \quad \text{(EQ. 1)}$$

The threshold junction temperature, Tj, of the pass element 103 transistor is the temperature above which the transistor integrity begins to degrade. In other words, if the pass element 103 gets hotter than its threshold junction temperature, it will probably stop working properly. The threshold junction temperature may be represented as:

$$Tj = P*k + Tamb \quad \text{(EQ. 2)}$$

where P is the power dissipated in the pass element, k is a constant dependent upon the physical characteristics of the pass element, and Tamb is the ambient temperature about the pass element. Thus, if the ambient temperature is 35 degrees C., and the threshold junction temperature is 150 degrees C., a power dissipation temperature of 115 degrees may be tolerated while still ensuring proper pass element operation.

Solving for P in EQ. 2 yields:

$$P = (Tj - Tamb)/k \quad \text{(EQ. 3)}$$

From EQ. 3, two things may be inferred: First, for a given ambient temperature, power dissipation is roughly proportional to junction temperature. Second, for a given maximum junction temperature, there is a predetermined power dissipation level above which a pass element will fail.

This invention takes advantage of these two pieces of information to create a low cost, linear charger with a maximum pass element power dissipation limit. The charger is thus capable of operation in the danger zones without fear of failure. The invention keeps the power dissipation of the pass element below a maximum level by reducing Ichg prior to the pass element temperature exceeding the maximum junction temperature. In so doing, the invention provides a safeguard against component failure in battery charging applications.

Figure 6:
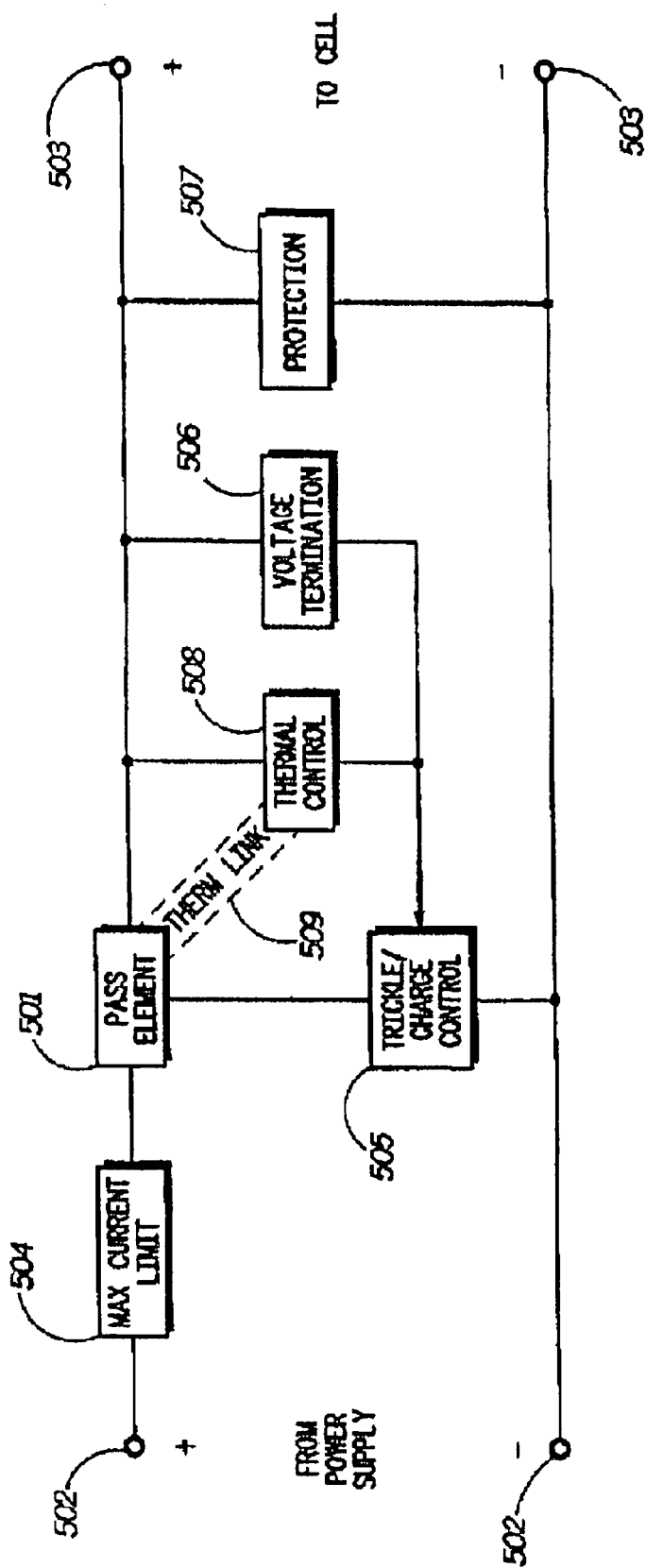
FIG. 6 is a block diagram of a circuit in accordance with the invention.

Referring now to FIG. 6, illustrated therein one preferred embodiment of a power regulation and thermal management circuit in block diagram form in accordance with the invention. The circuit includes a traditional pass element 501, as well as power supply terminals 502 and cell connection terminals 503. The circuit includes a maximum current limit circuit 504 that keeps the charging current, Ichg, below a predetermined maximum threshold. A voltage termination circuit 505 causes the pass element 501 to open when the cell is fully charged. A protection circuit 507 is provided to ensure safe operation of the cell while charging and discharging.

A trickle/charge control circuit 505 controls the pass element 501. Such a circuit is recited in commonly assigned, copending application Ser. No. 10/155790, entitled Battery Trickle Charging Circuit, Filed May 26, 2002, which is incorporated herein by reference for all purposes.

The circuit includes a thermal control 508 for regulating the maximum power dissipation in the pass element 501. The thermal control 508 is thermally coupled to the pass element 501 by way of a thermal link 509. The thermal link is preferably created by a close physical proximity between the pass element 501 and the thermal control circuit 508.

Figure 7:
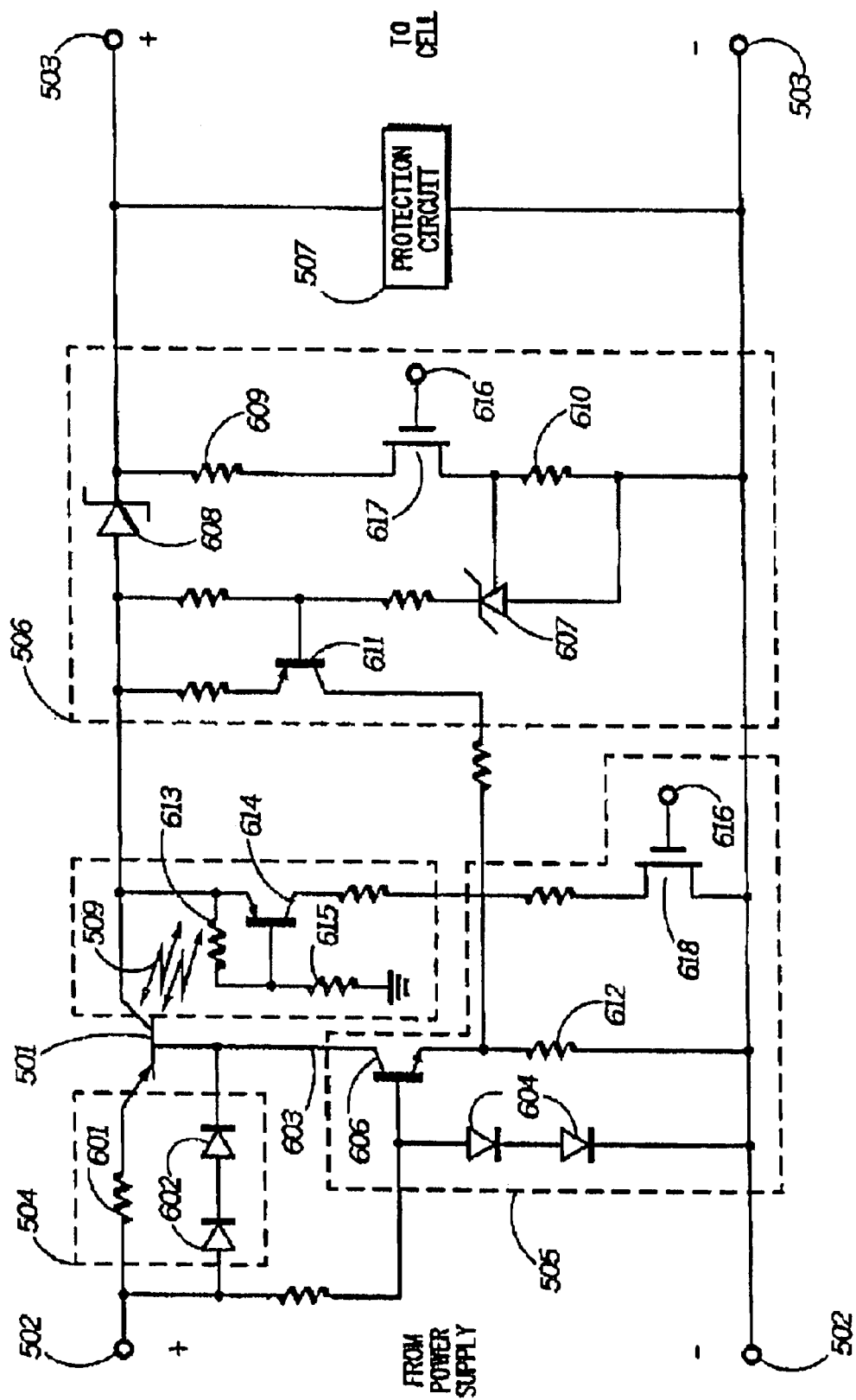
FIG. 7 is one preferred embodiment of a circuit in accordance with the invention.

Referring to FIG. 7, illustrated therein is a preferred circuit embodiment for the block diagram of FIG. 6. Each block of FIG. 6, including the maximum current limit 504, the pass element 501, the thermal control 508, the trickle control 505 and the voltage termination circuit 506, are shown in FIG. 7 with dashed lines.

The current control 504 circuit comprises a resistor 601 coupled serially with the pass element 501 and a pair of diodes 602 coupled to the base 603 of the pass element 501. The value of the resistor 601, in combination with the forward bias voltage of the diodes 602 as they source current to the base 603, establish a maximum current that will flow through the pass element.

The charge control 505 utilizes a pair of diodes in conjunction with a transistor to establish a current from the base 603 of the pass element 506. This is recited in application Ser. No. 10/155790, as mentioned above. For the present discussion, it is sufficient to say that the diodes 604 establish a base to emitter voltage, and thus a current, in the transistor 606. This current in transistor 606 actuates the pass element 501.

The voltage termination circuit 506 utilizes a voltage regulator 607, like the TL431 manufactured by Motorola for example, to sense the voltage difference across a blocking diode 608. When the voltage across the cell terminals 503 reaches a predetermined threshold set by resistors 609 and 610, the voltage regulator 607 actuates transistor 611, thereby sourcing current into the charge control 505. This current causes the voltage across resistor 612 to increase, thereby reducing the base to emitter voltage of transistor 606. The reduction of the base to emitter voltage causes transistor 606 to reduce the current flowing through it, thereby reducing the current flowing through the pass element 501. Note that the three terminals labeled 616 are preferably a common node, and may be used to actuate enabling transistors 617 and 618 when a power supply is coupled to the circuit.

A protection circuit 507 is provided as well. This may be any of a number of off the shelf protection circuits, like the NCP802 integrated circuit manufactured by Ricoh for example. Other protection circuits known in the art would substitute equally as well.

It is the thermal control circuit 508 that serves as the power limiting control for the pass element 501. The cornerstone of the thermal control circuit is a positive temperature coefficient (PTC) device 613. A PTC has a thermal characteristic such that its resistance increases with temperature. The PTC 613 includes a thermal link 509 that is created by designing the circuit such that the PTC 613 is in close physical proximity to the pass element 501. Preferably, the PTC 613 is physically coupled to the pass element 501 for the most efficient thermal linkage.

When the pass element 501 operates in a danger zone, power dissipation in the pass element 501 increases. The increased power dissipation takes the form of heat, which is translated via the thermal link 509 to the PTC 613. When the PTC 613 heats, the impedance changes, thereby decreasing the current sourced to the base of transistor 614. The decreased base current (and corresponding decreased voltage) causes current to flow through transistor 614 to the charge control circuit 505. As stated above, this current causes the voltage across resistor 612 to increase, thereby reducing the base to emitter voltage of transistor 606. The reduction of the base to emitter voltage causes transistor 606 to reduce the current flowing through it, thereby reducing the current flowing through the pass element 501.

By selecting the proper value for resistor 615, the thermal characteristics of the thermal control circuit 508, i.e. exactly where transistor 614 turns on, may be tailored to match the thermal characteristic (defined by the junction temperature) of pass element 501. Thus, when the power dissipation of the pass element 501 increases to a predetermined threshold, the thermal control circuit 508 will regulate the pass element 501 at a constant power level. This regulation continues until the circuit is out of the danger zone and the pass element 501 begins to cool.

Note that the circuit of FIG. 7 is preferably suited for applications in which the circuit is either being used in a charging state (i.e. injecting current into the cell), or a discharging state (i.e. where current flows from the cell to a load). For example, the typical digital camera is either coupled to the wall and being charged, or is detached from the wall and in use. Rarely is it being simultaneously charged and discharged at the same time.

Cellular phones, by contrast, are sometimes being charged and put to use at the same time. A situation may arise regarding the circuit of FIG. 7 during the charge/discharge application. If the cell is being charged and the circuit is in a danger zone, the thermal control circuit 508 will reduce the current in the pass element 501. The temperature of the PTC 613 drives this decrease in current. There is a finite amount of time necessary for the PTC 613 to cool. If a load is coupled to the circuit before the PTC 613 cools, the pass element 501 may prevent the necessary current from being delivered to the load. Consequently, the load may not operate properly.

One solution to this issue contemplated with the invention is to add a timer and voltage sense circuit. The timer periodically overrides the thermal control circuit and measures the voltage across the pass element 501. If the pass element 501 is no longer in a danger zone, the timer circuit allows the pass element 501 to return to saturation by keeping the thermal control circuit override active until the PTC 613 has cooled.

Figure 8:
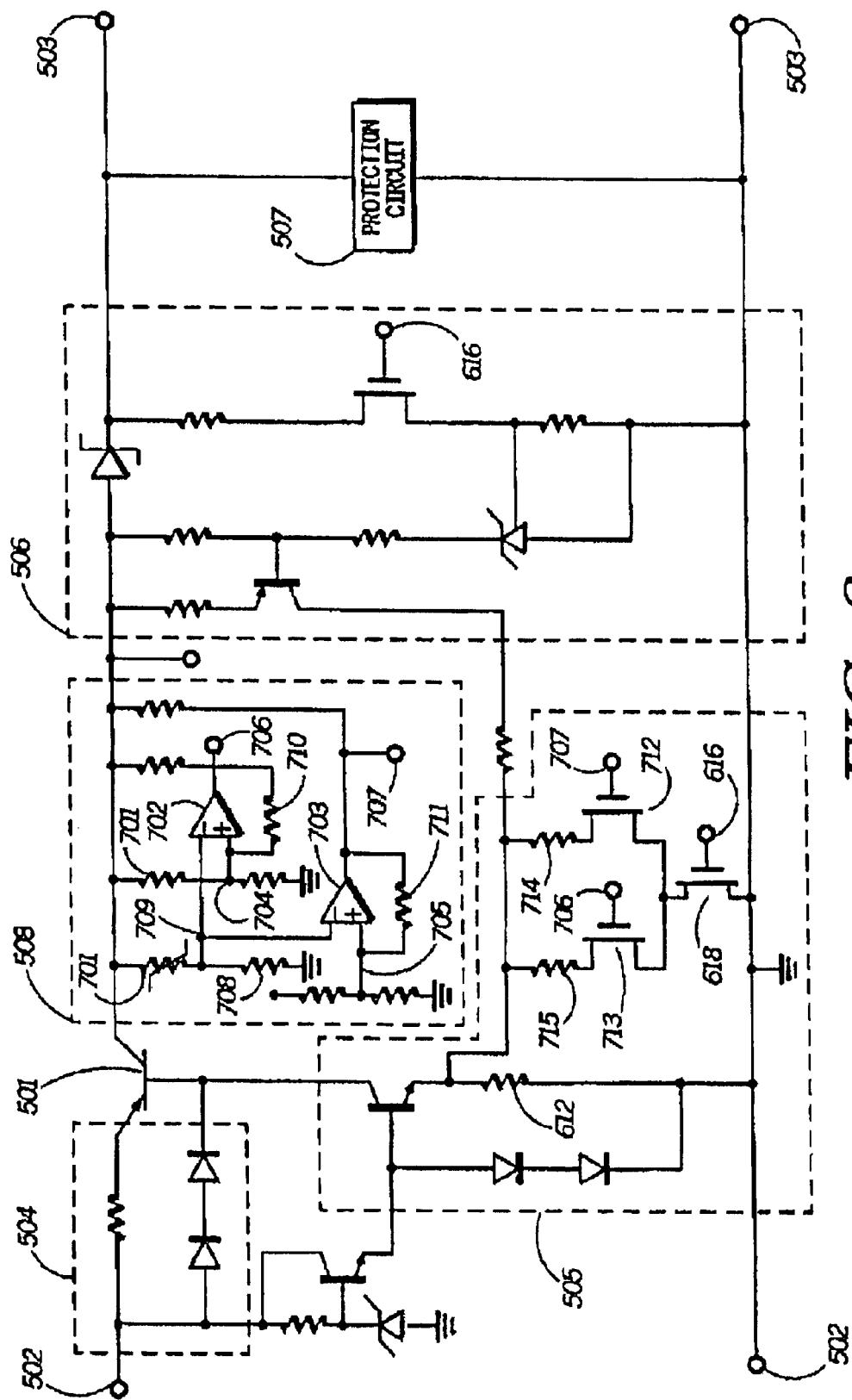
FIG. 8 is an alternate embodiment of a circuit in accordance with the invention.

Turning now to FIG. 8, illustrated therein is another solution to the simultaneous charge-discharge requirement. Illustrated in FIG. 8 is a circuit that is similar in many ways to the circuit of FIG. 7. The circuit of FIG. 8 includes the pass element 501, power supply terminals 502 and cell connection terminals 503. Additionally, the maximum current limit circuit 504, voltage termination circuit 505, and protection circuit 507 are identical to those of FIG. 7. The trickle/charge control circuit 505 is roughly the same, including the enabling transistor 618.

However, in the circuit of FIG. 8, the thermal control circuit 508 is changed to accommodate dynamic charge-discharge capabilities. The thermal control circuit includes a thermally sensitive component 701, which is preferably a thermistor, that is in close physical proximity to the pass element 501. Note that a thermistor's impedance changes linearly with temperature. The changing impedance of the thermistor, coupled with resistor 708, create a thermally proportional voltage 709 that is coupled to a first comparator 702 and a second comparator 703. The first comparator 702 and second comparator 703 each have corresponding reference voltages, which are voltage 704 and 705, respectively. The reference voltages 704,705 correspond to different, predetermined temperature levels. Note that the references may change with power supply voltage.

The operation of the thermal control circuit 508 is as follows: Presume for the purposes of this example that voltage 705 is less than 704. In a danger zone, when the temperature of the pass element and thus the corresponding thermistor 701 increase above voltage 705, node 707 is actuated. The actuation of node 707 deactuates transistor 712. The deactuation of transistor 712 causes resistor 714 to be decoupled in parallel with resistor 612, thereby decreasing the current in the pass element 501. If the temperature, and thus voltage 709, increases above voltage 704, node 706 is actuated, thereby deactuating transistor 713. This causes resistor 715 to be decoupled in parallel with resistors 714 and 612, again reducing the current in the pass element 501. Once the thermistor 701 cools, transistors 713 and 712 are eventually actuated, thereby allowing the pass element to return to a full-conduction state 501.

In one preferred embodiment, each comparator 702,703 includes positive feedback in the form of high-impedance resistors 710 and 711. This positive feedback turns the temperatures set by voltage 704 and 705 into bands of temperatures by way of hysteresis. In other words, if voltage 705 originally corresponded to 75° C., with hysteresis node 707 may actuate at 80° C. and deactuate at 70° C. By tailoring the values of hysteresis resistors 710 and 711, four temperature thresholds may be designed into the system.

These thresholds expand the protection of the circuit by altering the current at four different pass element 501 power dissipation levels, thereby finding a maximum charging current that keeps the pass element 501 below the maximum power dissipation level with greater resolution. In a preferred embodiment, for a typical pass element in a TO-220 package, the four levels correspond to 75° C. and 100° C. for comparator 703 and 85° C. and 110° C. for comparator 702. The circuit operates effectively so long as the first level is between 50° C. and 85° C., the second level is between 85° C. and 115° C., the third level is between 75° C. and 100° C. and the fourth level is between 85° C. and 130° C., depending upon the type of pass element being used.

Thus, if the pass element 501 exceeds predetermined temperature limits, the thermal control circuit 508 alters the current in the pass element 501 by way of the control circuit 505. For example, using the preferred temperatures above, if the temperature exceeds 100° C., transistor 712 is deactuated to reduce the current in the pass element 501. Transistor 712 will not actuate until the temperature drops below 75° C. Likewise, if the temperature the temperature exceeds 110° C., transistor 713 is deactuated, thereby reducing the current in the pass element 501. Transistor 713 will not actuate until the temperature drops below 85° C. The maximum pass element charge current will not resume until the pass element temperature falls below 75° C.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A charging circuit, the circuit comprising:
   a. an interface for coupling to a power source;
   b. an interface for coupling to a rechargeable battery cell;
   c. at least one pass element having a control terminal, the at least one element coupled serially between the interface for coupling to a power source and the interface for coupling to a rechargeable battery cell;
   d. a maximum current limiting circuit coupled serially between the interface for coupling to a power source and the interface for coupling to a rechargeable battery cell;
   e. a control circuit coupled to the control terminal of the at least one pass element; and
   f. a thermal control circuit, wherein the thermal control circuit is thermally coupled to the pass element and electrically coupled to the control circuit.

2. The circuit of claim 1, further comprising a voltage termination circuit coupled to the control circuit.

3. The circuit of claim 2, further comprising a protection circuit coupled in parallel across the interface for coupling to a rechargeable battery cell.

4. The circuit of claim 3, wherein the thermal control circuit is electrically coupled to the pass element.

5. The circuit of claim 2, wherein the thermal control circuit comprises:
   a. a positive temperature coefficient device disposed in close physical proximity to the at least one pass element; and
   b. a means of altering current in the thermal control circuit, wherein the means of altering the current is responsive to changes in temperature of the positive temperature coefficient device.

6. The circuit of claim 5, wherein the means of altering current in the thermal control circuit alters current in the control circuit, thereby altering the impedance of the at least one pass element.

7. The circuit of claim 6, wherein the control circuit comprises a bipolar junction transistor having an emitter, further wherein the means for altering current in the thermal control circuit is coupled to the emitter.

8. The circuit of claim 2, wherein the thermal control circuit comprises:
   a. a thermistor disposed in close physical proximity to the at least one pass element; and
   b. at least one comparator coupled to the thermistor, the at least one comparator capable of generating at least one control signal, the at least one control signal corresponding to a predetermined temperature of the thermistor;

wherein the control circuit alters the impedance of the at least one pass element in response to the at least one control signal.

9. The circuit of claim 8, further comprising at least one reference voltage and at least one hysteresis means, wherein the at least one reference voltage corresponds to a predetermined temperature threshold of the at least one pass element.

10. The circuit of claim 9, comprising:
    a. at least a first comparator coupled to the thermistor;
    b. at least a second comparator coupled to the thermistor;
    c. at least a first reference voltage coupled to the at least a first comparator;
    d. at least a second reference voltage coupled to the at least a second comparator;
    e. at least a first hysteresis means coupled to the at least a first comparator; and
    f. at least a second hysteresis means coupled to the at least a second comparator;

wherein the at least a first hysteresis means establishes a first temperature threshold and a second temperature threshold, and the at least a second hysteresis means establishes a third temperature threshold and a fourth temperature threshold.

11. The circuit of claim 10, wherein:
    a. the first temperature threshold is less than the second temperature threshold;
    b. the second temperature threshold is less than the third temperature threshold; and
    c. the fourth temperature threshold is greater than the third temperature threshold.

12. The circuit of claim 11, wherein:
    a. the first temperature threshold is between 50° C. and 75° C.;
    b. the second level is between 75° C. and 100° C.;
    c. the third level is between 85° C. and 115° C.; and
    d. the fourth level is between 85° C. and 130° C.

13. The circuit of claim 12, wherein:
    a. the first temperature threshold is 75° C.;
    b. the second temperature threshold is 85° C.
    c. the third temperature threshold is 100° C.; and
    d. the fourth temperature threshold is 110° C.

* * * * *